June 26, 1928. Re. 17,009

J. LOFGREN

ELECTRIC SWITCH

Original Filed Nov. 2, 1925 2 Sheets-Sheet 1

Inventor:
John Lofgren,
By Cheever & Cox Attys

June 26, 1928. Re. 17,009

J. LOFGREN

ELECTRIC SWITCH

Original Filed Nov. 2, 1925 2 Sheets-Sheet 2

Inventor:
John Lofgren,
By Cheever & Cox Attys.

Reissued June 26, 1928. Re. 17,009

UNITED STATES PATENT OFFICE.

JOHN LOFGREN, OF CHICAGO, ILLINOIS, ASSIGNOR TO RALCO MANUFACTURING COMPANY, OF CHICAGO, ILLINOIS, A CORPORATION OF ILLINOIS.

ELECTRIC SWITCH.

Original No. 1,648,022, dated November 8, 1927, Serial No. 66,142, filed November 2, 1925. Application for reissue filed January 27, 1928. Serial No. 250,026.

My invention relates to switches, especially of the type enclosed within a housing or casing and of heavy construction so that it may be employed on locomotives and in other situations where the device will be subjected to an unusual amount of vibration and to rough usage. The general object of the invention is to provide a simple and practical switch having the characteristics mentioned. Another object is to provide a construction in which the chief operating elements of the switch are enclosed within a housing and the operating handle is mounted on the housing cover, and the parts are so constructed that the handle will connect with and disconnect from the switch operating part merely by placing or removing the cover. Another object is to make allowances for minor discrepancies of manufacture so that the switch handle will take hold of the rotor when the cover is applied, even though the parts are somewhat irregular in construction or position. Another object is to provide means whereby the stationary terminals may be grouped in various ways to produce different effects when the rotor is rotated. Still another object is to provide means for insuring good electric contact between the rotor and its supply conductor, and also to provide convenient means for holding the rotor contacts in proper alignment with the stationary terminals. Still another object of my invention resides in providing a construction wherein the rotor is mounted to turn about an axis while at the same time is free to tilt laterally with respect to said axis so that the substantially opposed contact blades thereof may align with the inwardly projecting stationary blades. Still another object of my invention resides in the manner in which the rotor is both rotatably and tiltably mounted and particularly with the manner in which it makes clutching engagement with the forked portion of the handle in the cover on opposite sides of the axis of rotation of the rotor whereby the clutching connection with the handle does not interfere with the free tiltability of the rotor during turning. Still another object of my invention resides in the specific construction of the rotor with particular reference to the upper and lower discs having sector-like projections spaced apart and wipingly adapted to engage the inwardly projecting stationary contact strips; and particularly with reference to the arcuate projection of these two sector-like portions whereby they may co-operate with various combinations of arrangement of the inwardly projecting contact strips to produce a maximum number of lighting arrangements. Yet another object of my invention resides in the construction and arrangement of the insulating block within the housing and particularly with reference to the manner in which the stationary contact strip are mounted in notches and with binding posts passing therethrough and through the insulating block whereby securely to hold the stationary contacts in position. Yet another object resides in the construction and arrangement of this insulating block and in the arrangement of the upstanding notched flange carrying the stationary contacts and also the fastening means for detachably mounting the block in the housing and further, in the construction thereof with relation to the central countersunk portion in which the rotor is mounted whereby a very flat and compact switch mechanism is provided which also provides the maximum current carrying area of the several contacts and the rotor contacts. Still another object of my invention resides in the arrangement of the insulating member carried by the rotor and the manner wherein it makes a loose connection therewith to permit of an easy clutching engagement with the furcations of the handle. Still another object of my invention resides in the provision of a substantially water-tight housing with particular reference to the manner in which the handle is provided with a water shedding hood located at the opening in the cover through which the handle projects. These and other objects of my invention relate to the manner in which my switch provides compactness and strength in construction, ease and assembly in replacement of parts and is particularly adaptable for use as a locomotive headlight switch.

I obtain my objects by the mechanism illustrated in the accompanying drawings, in which Figure 1 is a perspective view of the complete device;

Like numerals denote like parts throughout the several views.

Figure 1:
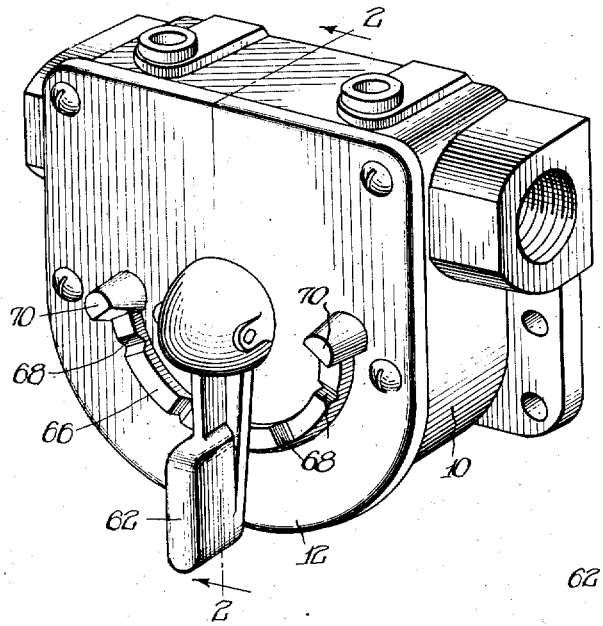

According to the design selected to illustrate the invention, the chief operating parts are located within a housing 10 provided with a cover 12, which may be bolted or otherwise removably secured in place. Fastened within the housing by means of studs 14 or other appropriate means is a base block 16 of insulating material. Between the block and the housing is a plate 18, which is also of insulating material.

Figure 5:
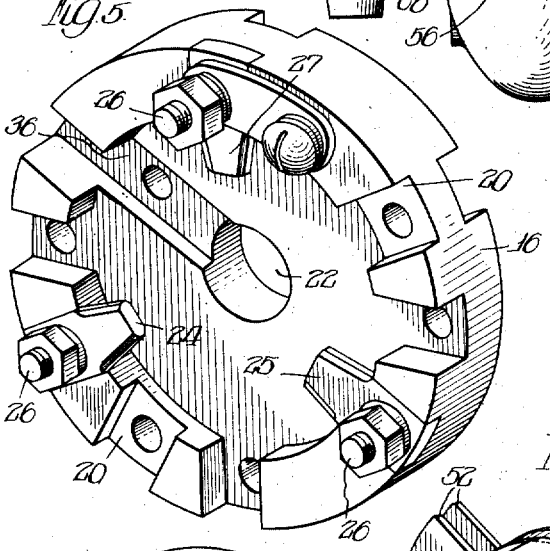
Figure 5 is a perspective view of the terminal base block.

The block 16, which is shown in perspective in Figure 5, is here shown to be circular in outline and provided with a number of notches 20 in its front face adjacent to the circumference. At the center it has an aperture 22. The notches 20 form seats for stationary terminals 24 which are provided with binding posts 26. These terminals form the stationary contacts and project radially inward towards the axis of the block. In the drawings I have shown three stationary terminals but more than three notches, the idea being to provide for an increased number of terminals or a different grouping thereof should occasion require.

One of the important features of the notched construction resides in the fact that this peripheral upstanding flange-like portion concentrically surrounds the countersunk portion forming the well and in which the rotor is mounted.

Another important feature of my invention resides in this upstanding circumferential flange-like portion which is provided with the notches or cutouts 20 for receiving the inwardly extending contact strips. By providing these notches 20 with holes for receiving the contact posts for the strips and by arranging the sides of the notches parallel and radial, I am enabled to seat the strips in the notches so as to snugly fit therein and to anchor them by means of one screw, such as 26, in position and this screw in addition to holding the contact strip in position, also constitutes the binding post stationary contact. It will be seen that this upstanding circumferential or peripheral flange in effect forms a central counter-sunk portion or well in which the rotor is adapted to be mounted.

Figure 2:
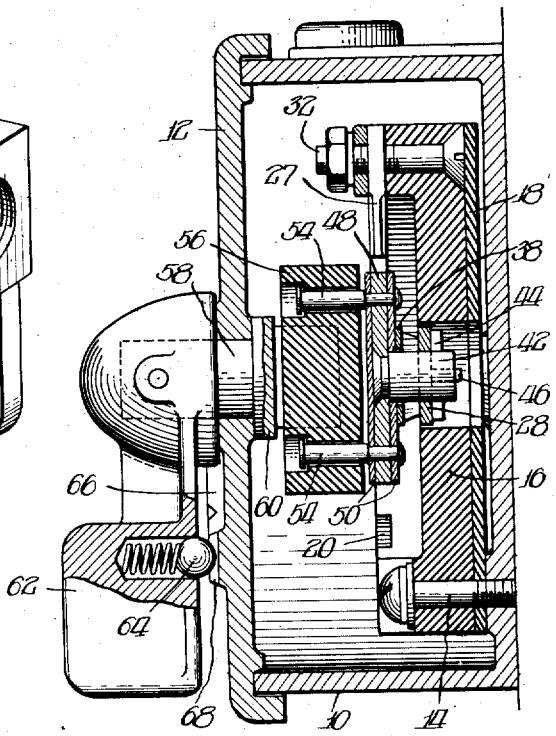
Figure 2 is a sectional view on the line 2—2 Figure 1.
Figure 3:
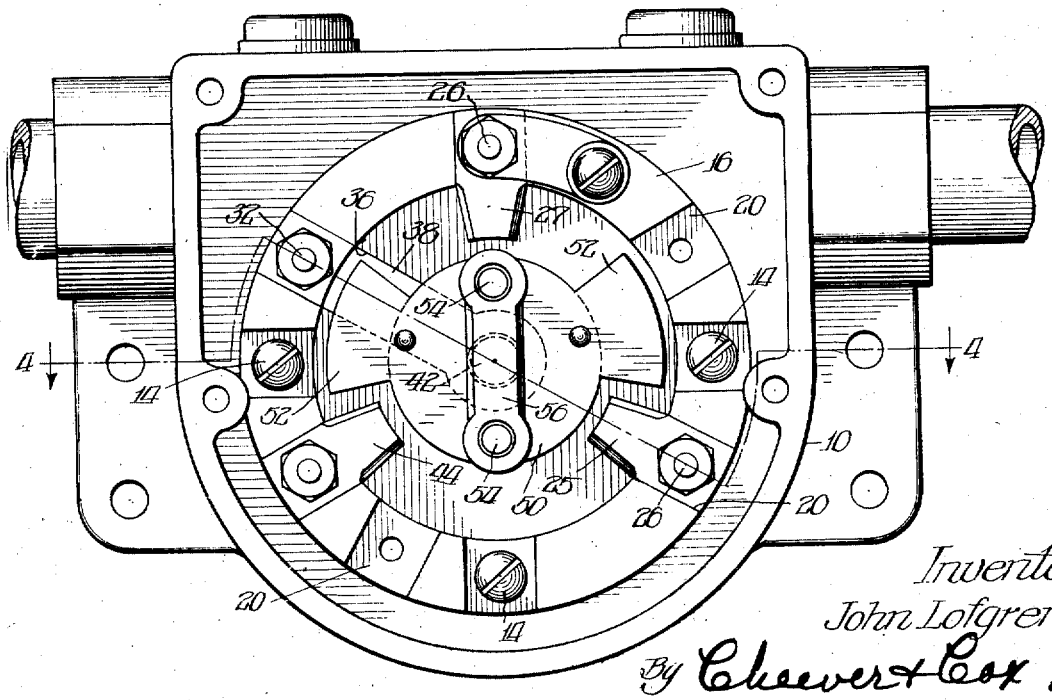
Figure 3 is a front view of the device with the housing cover removed for revealing the internal mechanism.
Figure 4:
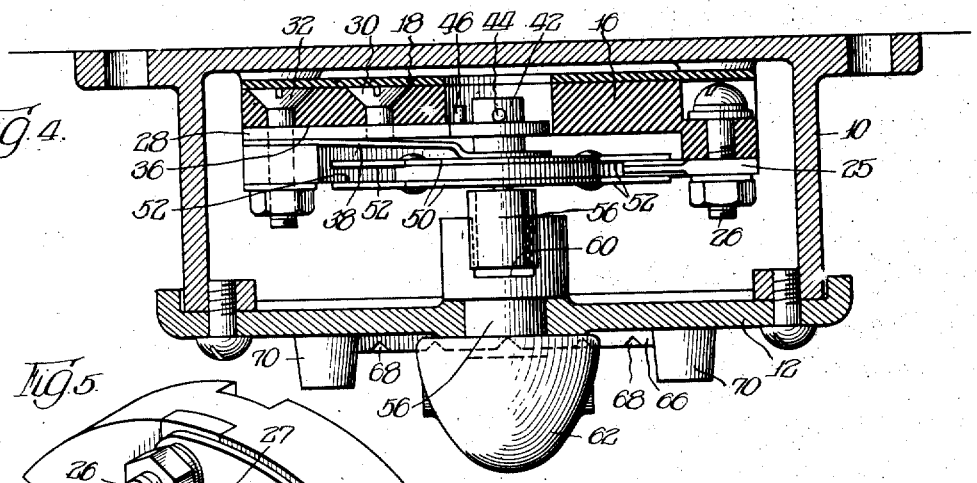
Figure 4 is a sectional view on the line 4—4 Figure 3.
Figure 8:
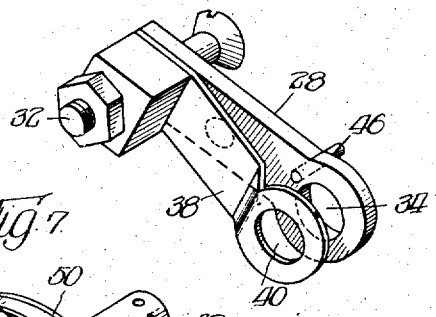
Figure 8 is a perspective view of the terminal bar and associated parts.

A terminal bar 28 of conductive material is fastened by screws 30 or otherwise to base block 16 in the manner best shown in Figures 2, 3 and 4. This bar is provided with a binding post 32 at one end and with an aperture 34 at the other end, as shown in perspective in Figure 8. It is arranged radially with reference to the base block and seats within a channel 36 formed therein as best shown in Figure 5.

Adjacent to the bar 28 is a leaf spring 38 which is secured at the outer end to the front of the bar and at the inner end has an aperture 40 coaxial with the aperture 34 in bar 28. This spring presses forward against one of the plates 50, hereinafter mentioned, and serves the double purpose of carrying current to it from bar 28 and also of preventing rattling of the parts. In addition, this contact spring 38 serves to press the rotor outwardly to provide a yielding, wiping contact between the contacts of the rotor and the stationary contacts while at the same time permitting the rotor to tilt laterally or out of its normal plane in case any inwardly projecting stationary contacts are slightly out of a common plane, all as hereinafter described.

The apertures 34 and 40 are for accommodating a stud 42 which is journaled in bar 28 and has a stop pin 44 for abutting the rear surface of bar 28 and thus limiting the distance to which the stud may be forced forward toward the front of the device. The amount of rotation of the stud is limited by a pin 46 fastened to bar 28 and projecting backwards therefrom into the path of pin 44. Thus the stud may be rotated back and forth but cannot revolve more than about 180 degrees, as pin 46 projects in both directions from the stud. Pin 44 also holds the rotor in place when the cover is removed.

Stud 42 is shouldered and riveted at the forward end in such manner as to firmly hold a disc 48 in the manner best shown in Figure 2. Riveted to this disc, one on each side thereof, are plates 50 having sectors 52 arranged in two pairs and projecting approximately in opposite directions from the disc. These sectors form jaws or contacts for engaging between them the terminals 24, 25, 27. It will be evident that these sectors or contacts 52 are rotatable and constitute two of the principal portions of the rotary element of the switch or "rotor."

In addition to having the rotor associated for turning movement with respect to the bearing 34 formed on the inner end of the bar 28, I also provide a construction wherein this rotor may tilt out of its normal plane of rotation and with respect to the common plane of the radially inwardly extending stationary contacts 24, 25 and 27.

To this end the hole 34 is constructed and arranged to make a machine fit with the stud 42 to support the stud and provide a bearing for it. This hole 34 is purposely made of somewhat larger diameter than the diameter of the stud 42 so that the stud may have a slight amount of lateral play in this bearing. This permits the rotor to tilt slightly out of a plane extending at right angles to its correct axis of rotation. The spring 38 is arranged to co-operate with this tiltable mounting of the rotor in that the spring in addition to carrying the current from the binding post 32 to the rotor, yieldably presses against the under side of the rotor and presses this rotor and stud outwardly so that the pin 44 passing through the opening in the end of the stud, will press against the under surface of the bearing 28. Thus this rotor is yieldably pressed outwardly so that when it is rotated and for instance, when the lower sector-shaped contacts 52 of the rotor wipingly engage beneath the under side of the stationary contact, this wiping engagement will tend to draw the rotor downwardly against tension of this spring 38 and thus provide a very firm wiping engagement between the upper and lower contacts of the rotor and the stationary contacts. In addition, it will be seen that by reason of this construction the spring, while free to act in the above manner, in nowise interferes with the tiltable mounting of the stud and rotor in its bearing and hence the rotor is free to tilt in the desired direction and with respect to the radially disposed contacts. This tilting construction is very important because frequently some of the stationary contacts are not exactly in the same horizontal plane and when the contact arms 52 are turned, it is necessary that the rotor be permitted to shift into and out of this horizontal plane not only to make a firm electrical contact with both of the contacts of the rotor with which the stationary contact wipes between but also to permit the rotor to turn. If the rotor were not tiltably mounted and if one of the stationary contacts were positioned above or below its true theoretical position it might easily prevent the turning of the rotor. Hence, due to this tiltable mounting of the rotor, any slight out-of-alignment of these stationary contacts does not interfere with the free operation of the rotor and does not interfere with the correct wiping contact of the sector-shaped members 52 and the stationary contacts.

Figure 7:
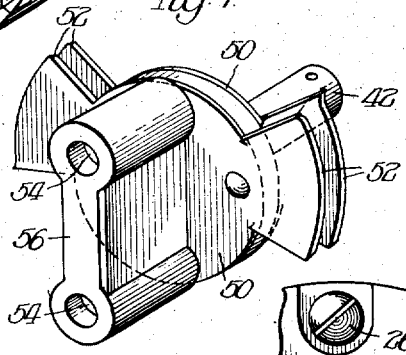
Figure 7 is a perspective view of the main elements of the rotor.
Figure 6:
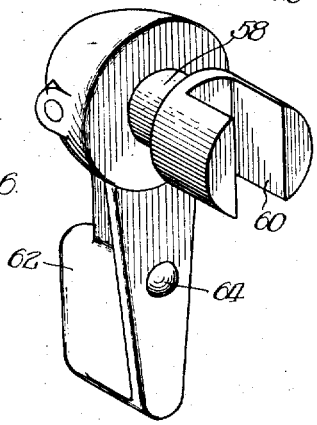
Figure 6 is a perspective view of the operating handle.
Figure 9:
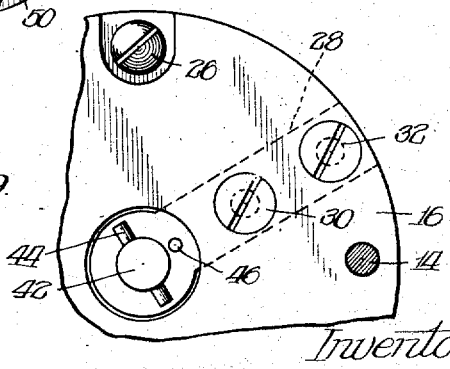
Figure 9 is a fragmentary view of the back side of the base block, showing the terminal bar and associated parts.

By reference to Figures 3 and 7 of the drawings and particularly Figure 3, it will be seen that the sector portions 52 of the upper and lower discs 50 are arranged so that their side edges provide sector-like openings therebetween, one of which openings is smaller than the other, the smaller opening, or that shown at the top of Figure 7 for instance, is approximately 90 degrees whereas the larger opening shown at the bottom of Figure 7 between the lowermost lateral edges of the opposed sectors 52, is approximately 160 degrees. By reason of the peculiar design and shape of these sector-like portions of the rotor and particularly with reference to the arrangement of the notches in the insulating block in which the various stationary contacts are or may be mounted, I am able to secure a great number of various groupings and contacting arrangements of the rotor with respect to these inwardly projecting stationary contacts whereby various combinations for lighting the rear headlight and front headlight either dim or full or on or off may be availed of.

Projecting forward from the disc 48 and plates 50 are two shouldered pins 54 which serve to hold an insulating block 56 in the manner best shown in Figure 2. The block is held loosely so that it may shift its position to a very slight extent to take care of inaccuracies of manufacture and to facilitate engagement with the operating shaft 58. Said shaft is journaled in the front cover 12 and is bifurcated at its inner end to fit over block 56. By preference the central slot 60 of the shaft is somewhat wider than block 56 so that the block may readily enter the slot when the cover is being applied.

Extending radially from the outer end of the shaft is an operating handle 62 which is of ample proportions and rugged so that it may withstand a considerable amount of abuse. On the inner side it has a spring-pressed ball 64 adapted to travel over a quadrant 66 having notches 68 for yieldingly holding the arm 62 in various positions. Heavy lugs 70 are cast integral with the cover 12 at the ends of the quadrant for limiting the swing of the operating handle. These form positive, rugged stops for limiting the angular movements of the handle.

In practice, when the base block 16, stationary terminals 24, and the rotor are mounted within the housing 10, as illustrated, the operating handle 62 is brought into and out of engagement with the block 56 of the rotor by merely applying the cover 12 to the housing and rotating the arm to such position as to fit over block 56. The slotted shaft 60 may be regarded as a clutch which is detachable from the rotor by moving it away in an axial direction. This forms a practical expedient which simplifies manufacture as well as simplifying the operation. By removing the cover and attached handle the operating parts of the switch are completely exposed.

Particular attention is drawn to the manner in which the furcations on the inner portion of the handle formed by the slot 60, co-operate with the insulating member 68 carried by the rotor and particularly the manner in which these furcations extend parallel to the axis of rotation of the rotor and on opposite sides of such axis and particularly in the manner in which the slot is of slightly greater width than the width of the insulating block 56 whereby the free clutching of the inner portion of the handle to the rotor is effected and whereby this clutching contact occurs on opposite sides of the axis of rotation of the rotor so as not to interfere with the free tilting of the rotor during rotation. This is an important feature of my invention.

Further attention is drawn to the substantially mushroom or hood-shaped construction of the substantially dome-shaped portion of the handle which covers the outer end of the shaft 58 and into which the shaft projects. This dome-shaped portion is provided with a transverse bore adapted to receive a pin which passes through in the bore in the outer end of the shaft whereby rigidly to connect the handle 62 with the outer end of the shaft and to hold the handle 62 in assembled position with the cover. By reference to the hood-shaped construction of this central portion of the handle it will be seen that the lower peripheral edges of this central portion of the handle overlie the opening or hole in the cover which is in coaxial alignment with the axis of rotation of the shaft and it will also be seen that I provide handle 62 as an all metal handle which is rigidly connected to its shaft 58. The foregoing construction is of particular advantage for use as a locomotive headlight switch adapted to be mounted within the cab of a locomotive. Since it is the practice to clean the cab with a hose, when the water is sprayed upon the inner portions of the cab this hooded portion of the handle will deflect the water away from the opening in the cover whereby to prevent the entrance of the water within the housing. In addition, by providing the handle 62 of rugged, metallic construction it withstands the blows given to it in usage since the locomotive engineers frequently turn the switch by striking it with some hard metallic object.

To operate, the handle 62 is rotated in one direction or the other. When used as a locomotive headlight the contacts 52 of the rotor and the terminals 24, 25 and 27 will usually be so arranged that when the handle is in central position as shown in Figure 1 the contacts 52 will be out of engagement with any of the terminals, and both locomotive headlights will be off. By rotating the handle to the next notch at the right the front headlight will be dim, and by rotating the handle to the extreme right the front headlight will receive full voltage. By rotating the handle to the left of central position the rear headlight will be controlled in the same manner. Thus the switch gives the locomotive engineer full control of both headlights.

It will thus be seen, by reference to the foregoing that I have provided a very compact switch which is particularly adapted for installation into the cab of a locomotive and for locomotive headlight use. By reason of the upstanding peripheral flange formed with the notches 20 providing a counter-sunk, substantially well-like portion concentrically therewithin and within which the rotor is mounted, I am enabled to provide a substantially shallow assembly wherein the upper and lower sector contacts of the rotor can wipingly engage above and below the inwardly projecting stationary contacts while at the same time permitting suffiicent clearance to permit the sectors to rotate and tilt and this construction in addition permits the use of a relatively small housing of substantially shallow design and at the same time permits the mounting of the operating handle permanently on the cover and in a manner so as to permit it to detachably connect with the switch rotor and turn the same while also permitting the rotor to tilt while turning. In addition, by reason of the construction of the sectors of a substantially exact design and by reason of the arcuate area of these sectors and their spaced apart arrangement and especially with respect to the inwardly extending contact strips, I am enabled to obtain the maximum current carrying area while insuring compactness of design. In addition, by reason of the exact arcuate and angular arrangement of these sectors with respect to the circumferentially and concentrically extending flanged portions provided with the notches and in which the stationary contacts may be adjustably arranged, I am enabled to produce the maximum number of lighting arrangements.

It will be understood that my device is not limited for use as a locomotive headlight switch. The base block 16, being provided with a considerable number of notches 20, is of course capable of supporting an equal number of stationary terminals 24. The consequence is that by altering the number and arrangement of terminals 24 and contacts 52 various arrangements of circuits may be provided for.

Having thus described my invention what I claim as new and desire to secure by Letters Patent is:—

1. A switch having a stationary terminal, a rotary switch blade for engaging and disengaging it, a stud on which said blade is mounted, a supporting element for the stud, a spring pressing against the switch blade in an axial direction for preventing rattling, a stop on the stud engaging said supporting element for limiting the movement of the stud to thereby hold the switch plate in alignment with the stationary terminal, and means for energizing said spring to thereby energize the switch blade.

2. A switch having a stationary terminal, a rotary switch blade for engaging and disengaging it, a stud on which said blade is mounted, a supporting element for the stud, a spring pressing against the switch blade in an axial direction for preventing rattling, and a stop pin projecting from the side of the stud for serving the dual purpose of limiting the axial movement of the stud under the pressure of the spring and for limiting the angular movement of the stud.

3. A switch having stationary terminals adapted to be variously grouped, a rotary switch element for engaging said terminals, a base on which the terminals are mounted, a spring pressing against the switch element for energizing it and preventing rattling, an insulating block for rotating the switch element, a handle fitting over the block for engaging and rotating it, a pin passing radially through the stud in both directions, and a stationary stop adapted to be engaged by said pin for limiting the rotation of the block to less than 180 degrees to establish the position which the block must occupy to be engaged by the handle, said pin also limiting the distance to which the stud may be moved axially under the force of the spring.

4. In a switch of the class described, the combination of a housing having an open top, a block of insulation therein having stationary contacts and having a bearing, a rotatable switch angularly shiftable with respect to the bearing, said switch having an insulation member thereon, a cover detachably connected to the housing to close the top thereof, said cover having an opening in line with the axis of the rotatable switch, a shaft rotatable in said opening in the cover, said shaft having a boss thereon located beneath the under face of the cover and formed with an enlargement providing two forked portions extending parallel with the axis of the rotatable switch and on each side thereof and adapted detachably to engage the insulation member of the rotatable switch to turn the switch when the shaft is rotated, and a switch handle rigidly connected to the outer end of the shaft and overlying the outer face of the cover.

5. In a switch of the class described, the combination of a cast iron housing having suitable apertures to receive fastening means for the cover, an insulation block mounted therein carrying stationary contacts, a switch rotatably mounted on said block and provided with an insulation member on its upper surface, a cast iron cover having openings registering with the apertures in the housing and detachably fastening means passing through the openings of said cover and housing whereby to detachably connect the cover to the housing, the upper surface of said cover having means thereon indicating the various positions of the switch, said cover having an opening therein in axial alignment with the axis of rotation of the switch, an all metal switch handle having a shaft rotatably mounted in said opening in the cover and formed with a bifurcated enlargement disposed beneath the under side of the cover, said furcations detachably engaging the insulation member of the rotary switch on opposite sides of its axis of rotation and whereby to turn the latter, said handle having an arm rigidly connected to the outer end of the shaft and overlying the upper surface of the cover and adapted, when shifted angularly, to co-operate with the indicating means on the cover to shift the switch to position corresponding to the indicating means on the cover.

6. In a switch of the class described, the combination of a housing carrying fixed contacts insulated therefrom and from each other, a rotary switch in said housing and having a relatively thin upstanding projection of insulation which projection passes diametrically across the axis of rotation of the switch, a cover detachably connected to the housing and provided with an opening in line with the axis of rotation of the switch, a handle permanently mounted on said cover and having a shaft turnably mounted in the opening thereof, the inner end of said shaft being bifurcated and detachably engaging opposite sides of the projection of insulation carried by the switch, said engagement occurring on opposite sides of the axis of rotation of said switch.

7. In a switch of the class described, the combination of a housing, a block of insulation within the housing, said block having a peripheral upstanding flange formed with spaced apart notches, said notches extending into a centrally located counter-sunk portion of the block forming a recess in the top thereof, stationary contacts mounted in certain of said notches and extending radially inwardly into said central recess and in spaced apart relation about the periphery of the block, screws passing through other notches in the periphery of the block, and passing through said block and through the bottom of the housing to secure the block in position, the upper face of the block also having a channel extending from its central portion to the outer edge of the block and registering with a notch in the outer circumference of the block, a strip mounted in said channel and lying substantially flush with the upper face of the channel, said strip having contact with a binding post mounted in that notch which registers with the channel and the inner end of said strip providing a bearing, a switch turnably associated with said bearing and comprising spaced apart upper and lower contacts adapted to engage therebetween the stationary contacts upon angular movement of the switch, said upper portion of the switch lying substantially flush with the upper face of the notched peripheral portion of the block, said switch having a portion projecting above the peripheral notched portion of said block and formed of insulation, a cover detachably mounted on the housing to close the top thereof and a handle rotatably mounted on the cover and having a portion detachably engaging the insulation member of the switch for turning the latter.

8. In a switch of the class described, the combination of a housing, a circular block of insulation material having a circumferential upstanding flange on its upper face, said flange forming an inner counter-sunk portion, and said flange having a plurality of spaced apart notches formed therein, said notches having parallel side walls and being provided with perforations passing through the block, screws passing through the perforations in certain of said notches and through perforations in the base of the housing to detachably fasten the block within the housing, radially extending contacts snugly and detachably seated in certain of the other notches, binding posts passing through said contacts and passing through perforations in said latter notches, a rotary switch mounted in said counter-sunk portion to move angularly with respect to the block, said switch having spaced contacts adapted wipingly to engage the radially disposed contacts mounted in the notches.

9. In a switch of the class described, the combination of a housing, a circular block of insulation therein and having a circumferential upstanding flange and a central counter-sunk portion forming a well, said upstanding flange having a plurality of spaced apart notches, means for detachably fastening the block to the base of the housing, contact strips disposed in certain of said notches and having their upper surfaces lying substantially flush with the upper face of said flanges, binding posts passing through said strips and into the notches, said block having a channel formed in the upper face of the well, a contact strip mounted in said channel and formed with a bearing in the central axis of the block, a binding post disposed at the outer end of said strip, said strip having its upper face substantially flush with the upper face of the well, a substantially flat switch associated with said bearing for turning movement with respect thereto, said switch including upper and lower sheet metal sector-shaped contacts slightly spaced apart and adapted wipingly to engage the upper and lower faces of the stationary contacts.

10. In a switch of the class described, the combination of a housing, a block of insulation mounted in said housing and having an upstanding peripheral flange and a concentrically disposed counter-bore within said flange to provide a well, a plurality of contact strips mounted in notches in the upstanding flange and arranged in spaced apart relation about the periphery thereof with the inner ends of said strips extending radially into said well portion, a relatively flat rotary switch mounted in the well portion and comprising spaced apart sheet metal discs formed with substantially opposed sector-like projections adapted wipingly to engage the upper and lower faces of the contact strips when the switch is turned, said switch being tiltably and yieldably mounted above its axis of rotation whereby to permit proper alignment of its sector-like contacts with respect to the inwardly projecting stationary contact strips.

11. In a switch of the class described, the combination of a housing, a block of insulation mounted therein provided with spaced apart contact strips extending inwardly and radially about a common central axis, a switch having upper and lower pairs of contact elements slightly spaced apart and adapted wipingly to engage therebetween the different inwardly projecting contact strips during turning movement of the switch, means for mounting said switch for turning movement about the common axis, said means permitting lateral tilting and including a spring to provide for the alignment of the spaced switch contacts with respect to the stationary contacts, said switch having an insulation member on its upper face, a cover for the switch, said cover having an opening in alignment with the axis of rotation of the switch, a handle carried by the cover and having a shaft passing through said opening, said shaft carrying spaced members disposed on opposite sides of the axis of rotation of the shaft and adapted loosely and detachably to engage the insulation member of the switch for turning the latter on movement of the handle.

12. In a switch of the class described, the combination of a housing, contact strips mounted in spaced apart relation within said housing and insulated therefrom, said strips extending radially inwardly about a common axis, a rotary switch mounted for rotation about the common axis of said contact strips, said switch including upper and lower contacts outwardly extending and disposed substantially on opposite sides of a diametral axis of said switch so as to wipingly engage the inwardly extending contacts therebetween, the rotatable mounting for said switch being constructed and arranged to permit said switch to tilt laterally during its rotation whereby to permit alignment of its upper and lower contacts with respect to the inwardly projecting contact strips, a cover for said housing having an opening in line with the axis of rotation of the switch, a handle having a shaft turnably mounted in said opening and provided with means insulated from said switch and adapted detachably to engage the latter on opposite sides of the axis of rotation of said switch for turning it when the handle is moved.

13. In a switch of the class described, the combination of a housing, insulating mounting therein carrying a plurality of contacts spaced apart about a common center and extending radially inwardly toward said center, a switch rotor mounted to turn about said common axis, said switch rotor comprising upper and lower discs having sector-shaped projections disposed approximately on opposite sides of the discs, the adjacent edges of said sector-shaped projections on one side being spaced apart approximately ninety degrees, and the other adjacent edges of the sector-shaped projections being spaced apart approximately 160 degrees, and means for rotating said rotor.

14. In a switch of the class described, the combination of a housing, an insulating block therein carrying stationary contacts mounted in spaced relation thereon about a common center, a rotor mounted for turning about said center as an axis, said rotor comprising a pair of sheet metal discs having sector-like integral projections extending outwardly approximately on opposite sides of said discs and a metal disc between said outer discs, there being fastening means passing through said discs to assemble the same and to maintain the upper discs slightly spaced apart so as to engage the stationary contacts therebetween on rotational movement of said rotor.

15. In a switch of the class described, the combination of a housing, an insulating block therein carrying stationary contacts mounted in spaced relation thereon about a common center, a rotor mounted for turning about said center as an axis, said rotor comprising a pair of sheet metal discs having sector-like integral projections extending outwardly approximately on opposite sides of said discs and a metal disc between said outer discs, there being fastening means passing through said discs to assemble the same and to maintain the upper discs slightly spaced apart so as to engage the stationary contacts therebetween on rotational movement of said rotor, and an insulating member mounted by said fastening means on the top of one of said upper discs, a cover for said housing, a handle permanently mounted on said cover and having means detachably engaging said insulating member of the rotor for turning said rotor.

16. In a switch of the class described, the combination of a housing, stationary contacts mounted in said housing about a common center, a rotor having contacts and turnably mounted about said common center, a cover closing the top of said housing and provided with a hole in line with the axis of rotation of the rotor, an all metal handle having a shaft passing through the opening of the cover and provided on the under side of the cover with means insulatingly and detachably connecting the rotor to turn the latter, and a lever-shaped handle having a mushroom-shaped head provided with a socket fitting over the outer end of said shaft and fastened thereto, said head portion of the handle substantially overlying the hole in the cover to shed water for said hole said lever-shaped handle having a recess opening on the under side of the handle, a spring in said recess, a detent at the mouth of said recess adapted to be urged outwardly by said spring, and an arcuate quadrant on the cover and having notches adapted to frictionally engage the ball during the movement of the lever arm to hold the same in turned position.

17. In a switch of the class described, the combination of a housing, a block of insulation within the housing having a peripheral up-standing flange formed with spaced apart notches, said notches extending into a centrally located countersunk portion of the block forming a recess in the top thereof, stationary contacts mounted in certain of said notches and extending radially inwardly to said central recess and in spaced apart relation about the periphery of the block, the upper face of the block also having a channel extending from its central portion to the outer edge of the block and registering with a notch in the outer circumference of the block, a strip mounted in said channel and lying substantially flush with the upper face of the channel, said strip having at its inner end means forming a bearing, a switch turnably associated with respect to said bearing and carrying contacts adapted to engage the stationary contacts upon angular movement of the switch.

18. In a switch of the class described, the combination of a housing, a block of insulation therein provided with peripheral spaced apart notches, stationary contacts mounted in said notches and extending radially inwardly about a common center, a channel formed in the upper face of said block and registering with one of said peripheral notches, said channel terminating at the central portion of the block, a strip lying in said channel, a binding post carried by the outer end of said strip and adapted to be disposed in one of said notches, the inner end of said strip being disposed at the center of the block and at the common axis of the contact and being provided with an opening thereat, a leaf spring mounted on the outer end of said strip by means of a binding post, said leaf spring having its inner end provided with an opening and said inner end of the leaf spring being normally sprung away from the inner end of the strip, a rotary switch having a stud lying in the apertures of the spring and the strip, said switch having substantially oppositely disposed contacts arranged in pairs and adapted wipingly to engage the stationary contacts on the blocks therebetween, and means for turning said switch.

JOHN LOFGREN.